United States Patent [19]

Epstein et al.

[11] 3,714,633

[45] Jan. 30, 1973

[54] SINGLE AND POLYCRYSTALLINE SEMICONDUCTORS

[75] Inventors: David J. Epstein, Watertown; David C. Bullock, Boston, both of Mass.

[73] Assignee: Massachusetts Institute of Technology, Cambridge, Mass.

[22] Filed: Aug. 21, 1970

[21] Appl. No.: 65,819

[52] U.S. Cl.....340/166 R, 317/235 AP, 340/174 CC
[51] Int. Cl. ................................................G11b 5/00
[58] Field of Search .........340/174, 166, 174 CC; 307/252; 317/235, 235 AP

[56] References Cited

UNITED STATES PATENTS

| | | | |
|---|---|---|---|
| 3,585,611 | 6/1971 | Lefkowitz | 317/235 AP |
| 3,503,055 | 3/1970 | Bobeck | 340/174 |
| 3,488,167 | 1/1970 | Chang et al. | 340/174 CC |
| 3,471,840 | 10/1969 | Bobeck | 340/174 |
| 3,470,546 | 9/1969 | Bobeck | 340/174 |
| 3,444,084 | 5/1969 | Geller et al | 340/174 CC |
| 3,164,816 | 1/1965 | Chang et al. | 340/174 CC |

*Primary Examiner*—Donald J. Yusko
*Attorney*—Thomas Cooch, Martin M. Santa and Robert Shaw

[57] ABSTRACT

A class of either single crystal or polycrystalline ferromagnetic materials containing an iron oxide whose resistivity vs. temperature characteristic is such that the resistivity decreased substantially with increasing temperature. The class has non-linear current-voltage (I-V) properties (when employed in electric circuit devices) characterized by a high resistance branch and a negative resistance branch, and the class also exhibits binary characteristics in that devices embodying materials of the class can be made to operate either in a memory state (low resistance) or a normal state (high resistance). The material of the class is prepared by a process which modifies the electrical conductivity of the iron oxide, which is originally highly insulating and also ferromagnetic, to render the material slightly conductive or semiconductive. In the insulating state the oxide contains iron in the trivalent state $Fe^{3+}$). The process includes reduction of the iron in the insulating oxide either by heat treating in a vacuum or a controlled atmosphere gas or by doping to reduce some of the trivalent iron ($Fe^{3+}$) to bivalent iron ($Fe^{2+}$). The material properties are such that when said devices are operated in either the negative resistance branch or in the memory state the ferromagnetic curie point of the material is exceeded and the ordered magnetic properties of the material are locally destroyed. The local destruction can be sensed optically or by other means. The materials of the class disclosed may be used simply in conductive devices, but they can also be used in apparatus, as, for example, the matrices discussed hereinafter, which employ their multi-faceted electrical characteristics as well as their magnetic properties. Materials, which exhibit characteristics of the high resistance branch and the negative resistance branch and are ferroelectric, are also disclosed, as are, also, iron oxide materials which exhibit such characteristics and are neither ferromagnetic nor ferroelectric.

22 Claims, 13 Drawing Figures

Patented Jan. 30, 1973 3,714,633

6 Sheets-Sheet 1

INVENTORS:
DAVID J. EPSTEIN
DAVID C. BULLOCK
BY Robert Shaw
ATTORNEY

INVENTORS:
DAVID J. EPSTEIN
DAVID C. BULLOCK
BY Robert Shaw
ATTORNEY

INVENTORS:
DAVID J. EPSTEIN
DAVID C. BULLOCK
BY Robert Carr
ATTORNEY

INVENTORS
DAVID J. EPSTEIN
DAVID C. BULLOCK
BY
ATTORNEY

INVENTORS:
DAVID J. EPSTEIN
DAVID C. BULLOCK
BY Robert S. Carr
ATTORNEY

INVENTORS:
DAVID J. EPSTEIN
DAVID C BULLOCK
BY
ATTORNEY

SINGLE AND POLYCRYSTALLINE SEMICONDUCTORS

The invention herein described was made in the course of contracts with the Office of the Secretary of Defense, Advanced Research Projects Agency.

The present invention relates to single and polycrystalline semiconductors having current-voltage properties characterized by a high-resistance branch and a negative-resistance branch and which exhibit binary characteristics, and, particularly, to iron-oxide bearing semiconductors which are also ferromagnetic.

The materials discussed herein in greatest detail include ferromagnetic garnets, orthoferrites, and spinels. Such materials are often used in electronic apparatus as devices or as portions of devices and are generally chosen for such use because of their very high electrical resistance. The present inventors have found that the materials exhibit other important electrical characteristics which arise when that resistance is lowered in the manner herein discussed. Thus, it is possible to obtain non-linear current-voltage (I-V) properties in said devices characterized by a high resistance branch and a negative resistance branch; and it is possible to provide binary characteristics which include a high resistance normal state and a low resistance memory state.

Accordingly, an object of the present invention is to provide a class of ferromagnetic materials which exhibit semiconductor properties.

A further object is to provide in such materials non-linear current-voltage properties characterized by a high resistance branch and a negative resistance branch.

A still further object is to provide materials which also display binary characteristics to allow devices embodying the materials to assume either a high resistance normal state or a low resistance memory state, it being another object to teach the method by which the devices can be made to assume one or the other of the states.

Another object is to provide a class of ferroelectric materials (e.g., $K_xNa_{1-x}TaO_3$, $KTa_xNb_{1-x}O_3$, $Ba_xSr_{1-x}TiO_2$) which exhibit some of the above-mentioned characteristics.

Another object is to provide matrices employing the class of materials mentioned and employing the novel characteristics thereof particularly to perform storage functions for computer memory systems and the like.

Still another object is to teach a process by which highly insulating materials are transformed into materials having the foregoing characteristics.

These and still further objects are discussed in the description hereinafter and are particularly delineated in the appended claims.

The objects of the invention are achieved, generally, in ferromagnetic and/or ferroelectric materials having a non-linear current-voltage characteristic which includes a high resistance branch and a negative resistance branch. The materials may also exhibit binary characteristics whereby devices employing such material can be switched from a high resistance normal state to a low resistance memory state and vice versa. The material properties are such that when said devices are operated in either the negative resistance branch or in the memory state the ferromagnetic or ferroelectric (as the case may be) curie point of the material is exceeded and the ordered magnetic (or ferroelectric) properties of the material are locally destroyed.

The invention is hereinafter discussed with reference to the accompanying drawing, in which.

The invention herein disclosed is concerned primarily with iron oxide bearing, single crystal and polycrystalline materials which display ferromagnetic properties, which display a nonlinear current vs. voltage (I-V) characteristic that includes a high resistance branch and a negative resistance branch, and which also display memory characteristics. Said materials have a resistivity vs. temperature characteristic such that the resistance decreases substantially with increasing temperature within the range of temperatures to which such materials (or areas in the materials) are subjected in the course of use in operating devices (i.e., typically 300° to 900° K for the yttrium-iron-garnet material discussed herein in greatest detail). The material properties are such that when devices embodying it are operated in either the negative resistance branch or in the memory state, the ferromagnetic curie point of the material is exceeded and the ordered magnetic properties of the material are totally destroyed. The materials of interest include garnets (e.g., $Y_3Fe_5O_{12}$, $Y_3Fe_{5-x}Ga_xO_{12}$, $Y_3Fe_{5-x}Al_xO_{12}$, where $x$ varies from zero to one), orthoferrites (e.g., $YFeO_3$, $TbFeO_3$), and spinels (e.g., $NiFe_2O_4$, $FeFe_2O_4$, $MgFe_2O_4$, $MnFe_2O_4$, and $CoFe_2O_4$ plus various solid solutions of these compounds).

Figure 1:
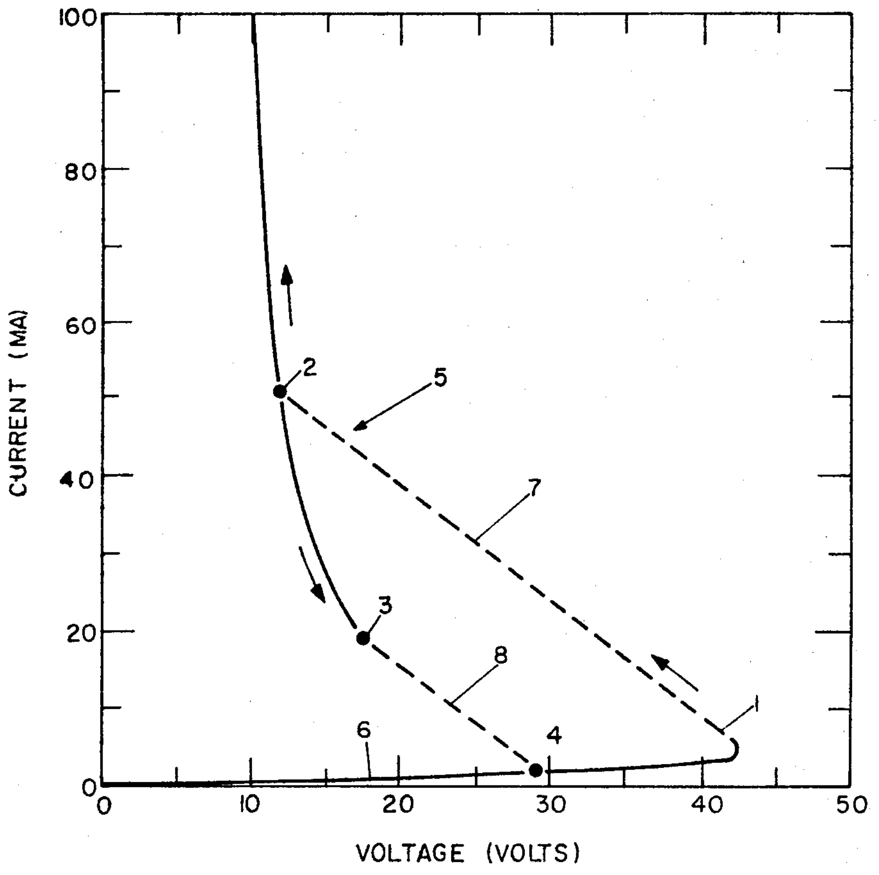
FIG. 1 is a characteristic current vs. voltage (I-V) curve for single crystal yttrium-iron-garnet (YIG) to which has been added silicon as a dopant and shows a high resistance branch and a negative resistance branch bridged by a transition region.

Garnets, orthoferrites, and spinels as used in the electronics industry are favored for their high resistance characteristics, and the industry has strived to increase the insulating properties. The material discussed in greatest detail herein is yttrium-iron-garnet (YIG), and this material, for example, has a room temperature resistivity of the order of $2 \times 10^{12}$ ohm-cm. The present invention contemplates lowering the insulating characteristics of garnets, orthoferrites and spinels to provide a material having the current-voltage characteristics typified by the curves in FIGS. 1 and 4 which are plots made in connection with an actual doped YIG device. The I-V curve in FIG. 1 is numbered 5; it has a high resistance portion 6 and negative resistance portion for current operation above a transition region 1. (The dashed line labeled 7 between the d-c threshold or transition region 1 and a point 2 indicates negative resistance switching between the threshold 1 and the point 2. This switching occurs in a situation wherein the voltage across the device is increased from 0 to about 40 volts, in the sample used, and then decreased to about 10 volts; the device, as shown, displays hysteresis characteristics, and, so, if the voltage is increased from the ten volts level to about 30 volts, negative resistance switching again occurs between a point 3 and a further point 4, as indicated by the dashed line shown at 8.) The material, after reduction, also has the current vs. voltage characteristics shown in FIG. 4 which shows a low resistance, nearly straight-line, memory state 10 and a high resistance nearly straight-line, normal state 11. One way in which the device is placed in either the normal state or the memory state, as alternate conditions of operation, is discussed hereinafter.

Figures 4, 5:
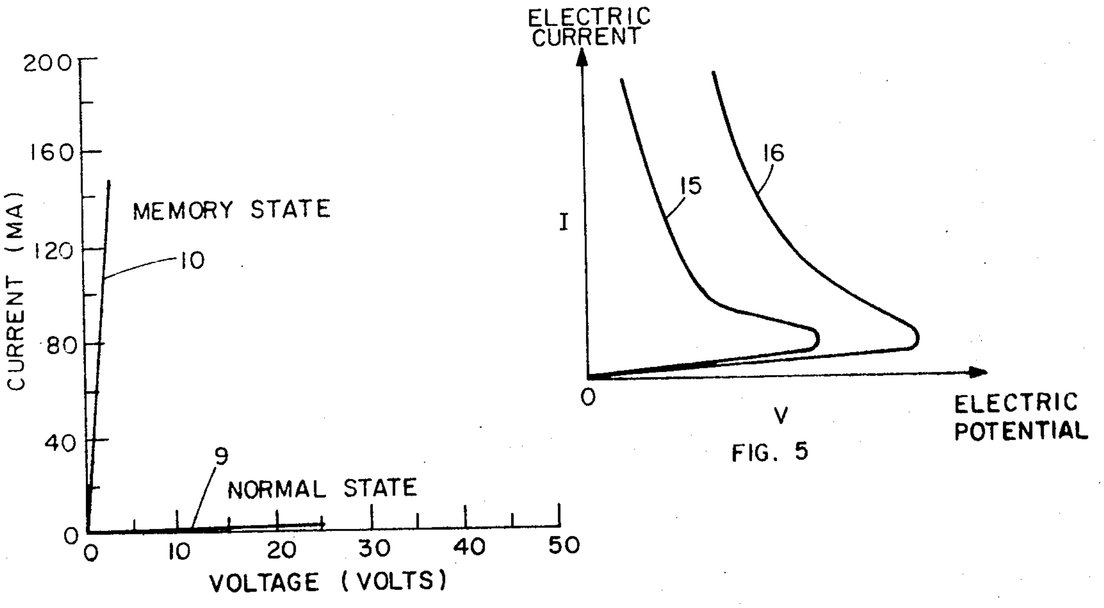
FIG. 4 shows I-V characteristics for a Si-YIG crystal similar to that having the characteristic curve of FIG. 1 and shows a binary mode of operation having a high resistance normal state and a low resistance memory state.
FIG. 5 shows I-V characteristics similar to that shown in FIG. 1 except for two different dopant levels in the crystal.

In this and the next several paragraphs, there is a discussion of the typical, thin, single crystal yttrium-iron-garnet wafer of the type from which the I-V Plots shown in FIGS. 1 and 4 were taken. Until the present disclosure, YIG has not been known to possess any features that would make it attractive either as a semiconductor or as a conductive memory device. It is, rather, well-known as a ferromagnetic material (curie temperature 287° C) possessing excellent high frequency magnetic properties. Undoped YIG is an insulator characterized by a temperature activated resistivity which is accurately described (over at least 12 decades of resistivity) by the relation $\rho = \rho_o \exp(E/kT)$ with $\rho_o = 6.3 \times 10^{-7}$ ohm-cm and E = 1.1 ev (room temperature resistivity $2 \times 10^{12}$ ohm-cm).

It is known that YIG can be converted from an insulator to a semiconductor by the introduction of a proper dopant which, in the present disclosure, is silicon. Silicon, as a dopant, enters the YIG lattice substitutionally as a $Si^{4+}$ ion. In order to maintain charge balance, some trivalent iron ($Fe^{3+}$) is converted to bivalent iron ($Fe^{2+}$) resulting in a composition $Y_3^{3+}Fe_{5-2\delta}^{3+}Fe_\delta^{2+}Si_\delta^{4+}O_{12}$. The simultaneous presence of $Fe^{2+}$ and $Fe^{3+}$ cations leads to *n*-type semiconduction in which the complexes of $Si^{4+}$—$Fe^{2+}$ act as donor centers; these, by thermal excitation, give rise to electrons that are mobile over a sublattice of $Fe^{3+}$ cations. Si-YIG samples studied typically contain silicon in amounts corresponding to $0.005 < \delta < 0.3$ mole percent. Resistivity measurements made on these samples over the interval 300°–900° K revealed a temperature activated conduction, spanning four decades in resistivity, which is governed by an activation energy of about 0.3 ev. Room temperature resistivities lie between $10^4$–$10^5$ ohm-cm.

The first-quadrant current-voltage (I-V) characteristic shown in FIG. 1 illustrates the current controlled negative resistance found in Si-YIG. The I-V plot 5 was obtained using a Tektronix Curve Tracer 13 in FIG. 6 (Type 576) and represents the current response to a manual sweep of a positive applied voltage. A sweep through the corresponding range of negative voltage yields an identical I-V plot in the third quadrant. There is a discontinuity in the trace between points 1 and 2 because in this region the 3K external load resistor 11 used is not high enough to stabilize the negative resistance of the sample. When the voltage is backed down to zero, the I-V characteristic shows a hysteresis effect, i.e., the return path is along 2–3–4 rather than along the forward path 1–2; between 3 and 4 there is again an unstabilized negative resistance jump.

Figure 6:
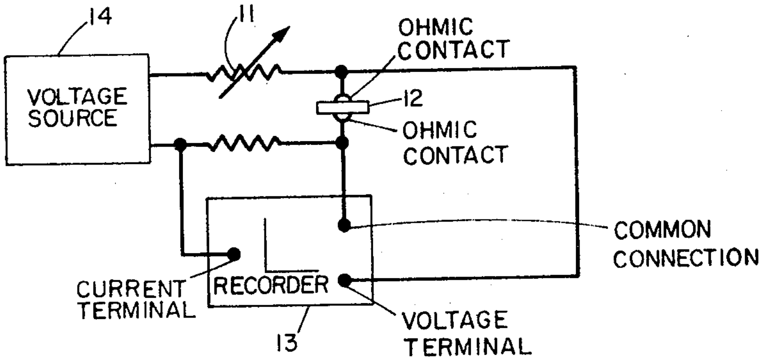
FIG. 6 is a schematic circuit diagram, partially in block diagram form, of a circuit adapted to provide the curves shown in FIGS. 1–5.

The measurements shown in FIG. 1 were made on a single crystal wafer 12, in FIG. 6, of Si-YIG ($\delta$=0.03) approximately 3 mm × 5 mm in lateral dimensions, lapped to a thickness of 1 mil. The bottom surface of the sample was coated with a rubbed-on indium-gallium electrode and the sample was epoxy bonded at its outer edges to a brass lapping block. After lapping, in the experimental work, the sample was left attached to the block for ease of handling. The block provided one connection to the external circuit and the other connection was made via a gold bellows placed in a pressure contact with an evaporated gold dot, 2 mm in diameter, vacuum deposited on the upper face of the sample. Experiments conducted with various electrode combinations of gold, platinum, aluminum, and indium-gallium on other samples did not reveal any particular sensitivity to electrode material. Sample thickness ranged from 1 to 5 mils and the d.c. threshold represented by the point or region 1 in FIG. 1 was found to be roughly proportional to thickness. In FIG. 6 the block is not shown; connections between the device 12 and the circuit are shown made through ohmic contacts.

Figure 2:
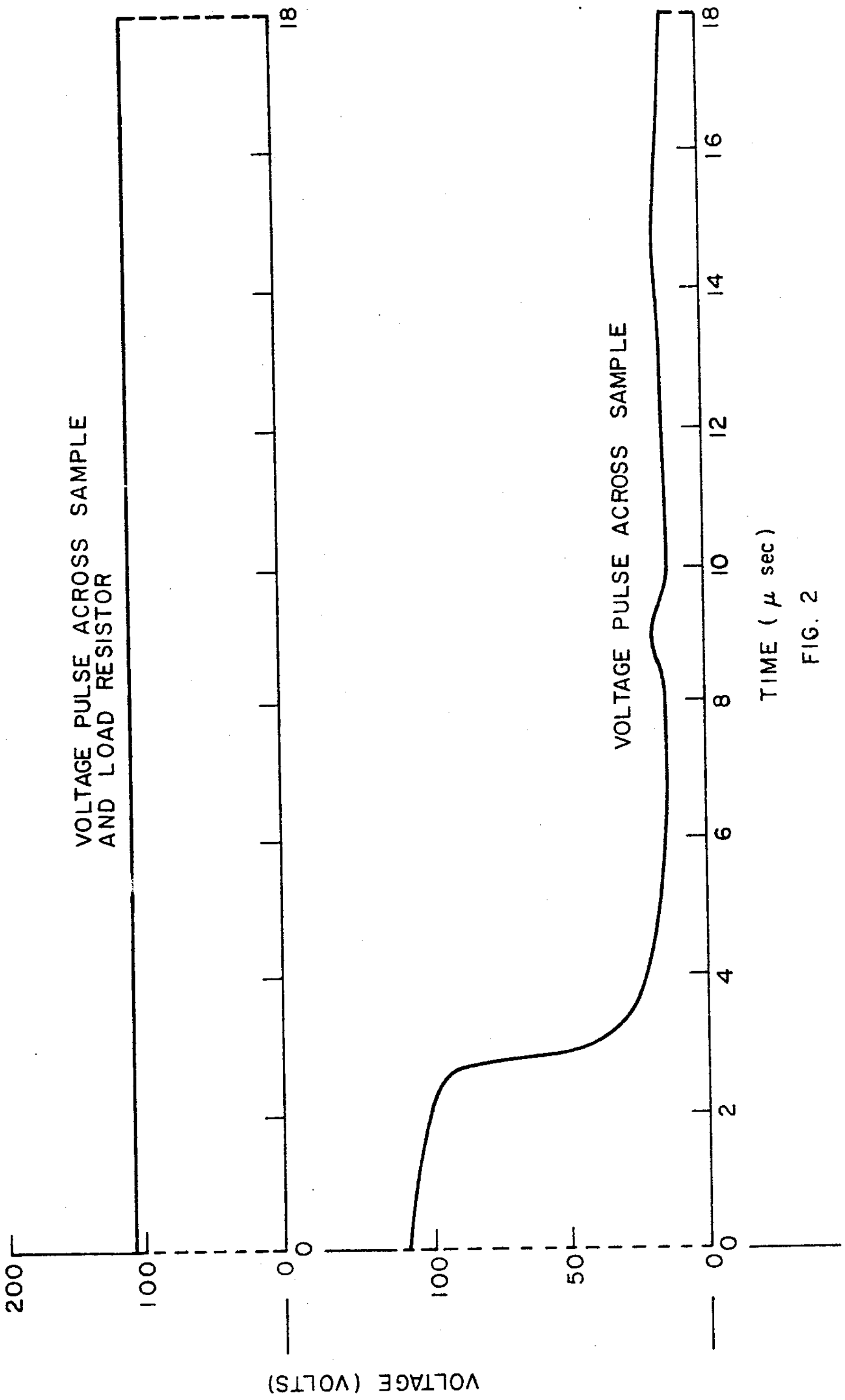
FIG. 2 shows curves of voltage vs. time respectively across a crystal, having the I-V characteristics of FIG. 1, and a series resistance and across the crystal only.

To investigate the switching behavior, represented by the I-V curves in FIG. 4, single shot pulsed voltage excitation was used. Typically, it was found that switching from the normal state to the memory state initially occurs at pulse voltages which are about twice the d.c. voltage threshold 1 in FIG. 1. With repeated switching the required pulse decreases in level and, eventually, falls to approximately the d.c. threshold value. It was found, also, that there exists a switching delay which is dependent on drive voltage. An increase in drive results in both less delay and a faster switching transient. Switching time also depends on the value of the series load resistor shown at 11; for fixed pulse amplitude the switching speed increases as the load resistor 11, which is shown to be variable, is reduced in value. FIG. 2 shows the switching behavior for a Si-YIG wafer having the 40 volt d.c. threshold shown in FIG. 1. A 110 volt pulse was applied to the sample through a series load resistor 11 of 820Ω. The observed switching delay was 3 μsec and the switching speed 0.2 μsec.

Figure 3:
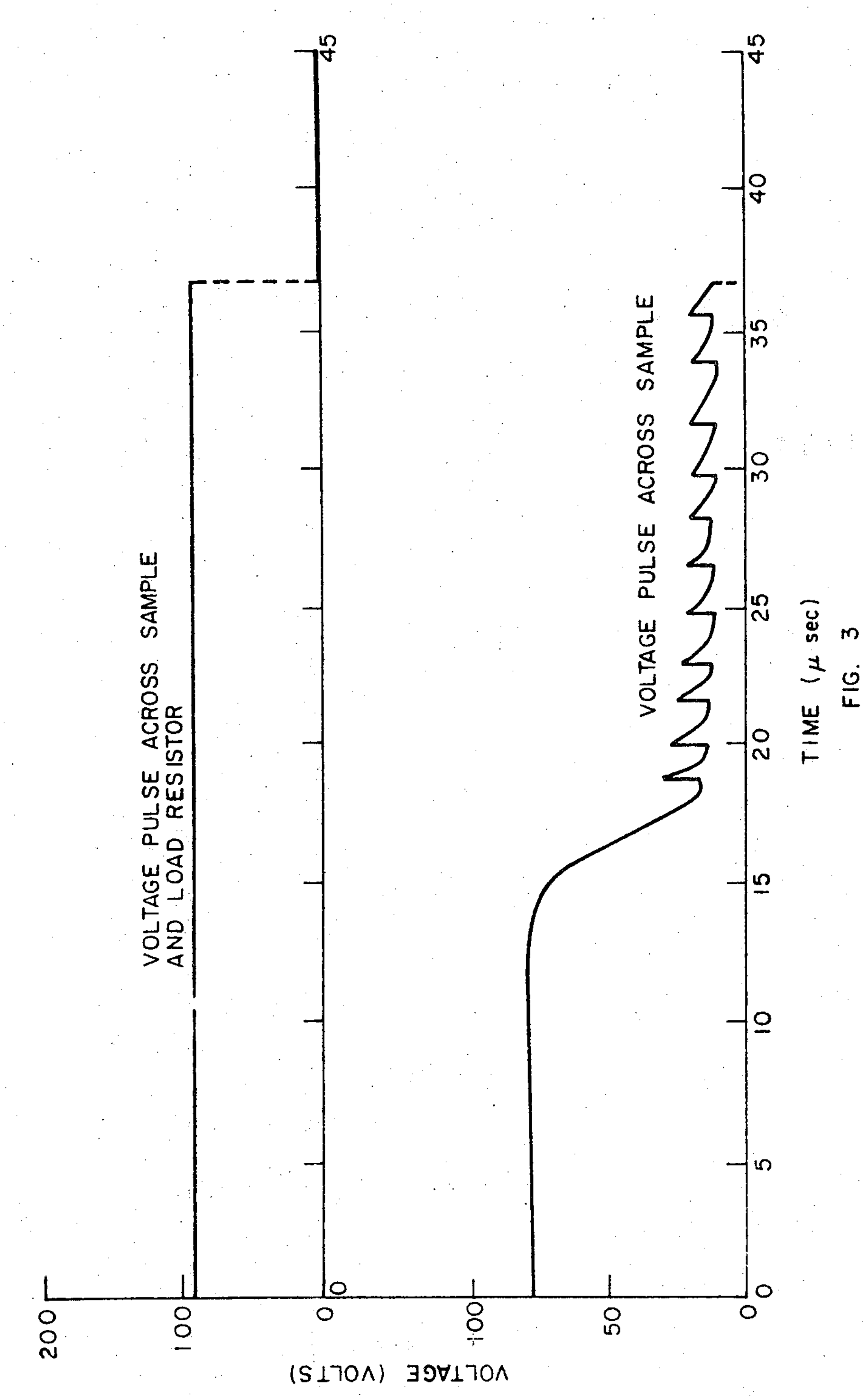
FIG. 3 shows curves of voltage vs. time respectively across a crystal, having the I-V characteristics of FIG. 1, and a series resistance and across the crystal only, the voltage across the crystal only in FIG. 3 being slightly higher than the voltage shown in FIG. 2, thereby to bias the crystal to operate in said negative resistance branch and to provide oscillations.

The correspondence between delay and voltage drive is shown in FIG. 3, wherein the voltage pulse across the sample is shown to be reduced from about 80 volts to a voltage which brings the load line to the nose (or threshold) region 1 of the I-V curve in FIG. 1. Under this condition, the system breaks into a negative resistance oscillation having a frequency which typically lies in the range 0.5–1 MHz. (In FIG. 3 the average spiking frequency is about 0.5 MHz.)

The samples tested also exhibit, as mentioned, a conductive memory state as represented by the curve 10 in FIG. 4, which can be entered by applying to the sample a 60 cycle voltage which exceeds the switching threshold voltage 1, as above discussed. As the voltage is increased, there eventually is reached a critical value at which the sample abruptly jumps from the high resistance normal state, as represented by the curve 9, to the highly conductive positive resistance memory state 10. The sample remains in this memory state after the a.c. voltage is reduced to zero. To return to the normal state, it is necessary to reduce the value of load resistor 11 and apply a short pulse of current of the order of 0.4 amperes for about ½ second. The cycle is repeatable. Electric potential and current are supplied by a variable and pulsed potential source 14 in FIG. 6. The source 14 (in combination with the resistor 11 in the illustrative example) acts as either a current or bias source to cause the device 12 to operate in either the high resistance branch or the negative resistance branch or the memory state or the normal state as successive or alternate conditions of operation.

As is mentioned above, the highly insulating YIG can be made semiconductive by the addition thereto of small amounts of a reducing agent or dopant such as, for example, silicon. The dopant effects reduction in the oxidation state of the YIG to provide cations of iron in multivalent states, the concentration of the cations determines the shape of the I-V characteristic represented by the curve 5 and the point at which transition occurs. The shape of the characteristic and the transition point can, in turn, be controlled by changing the amount of dopant in the crystal. The I-V curve shown at 15 in FIG. 5, which is a curve similar to the curve 5 in FIG. 1, represents a condition of high doping (e.g., the order of 0.3 mole percent) and the curve 16 represents a condition of low doping (e.g., the order of 0.03 mole percent). The crystal is grown from a melt and the silicon is added to the melt to provide uniform distribution of dopant throughout the crystal. In the process of reduction, a certain amount of $Fe^{3+}$ is changed to $Fe^{2+}$, as before discussed. Similar reduction can be accomplished by heat treating a YIG wafer in a vacuum or in a reducing atmosphere, as for example, hydrogen at 1,000° F for 6 to 8 hours.

Figure 7:
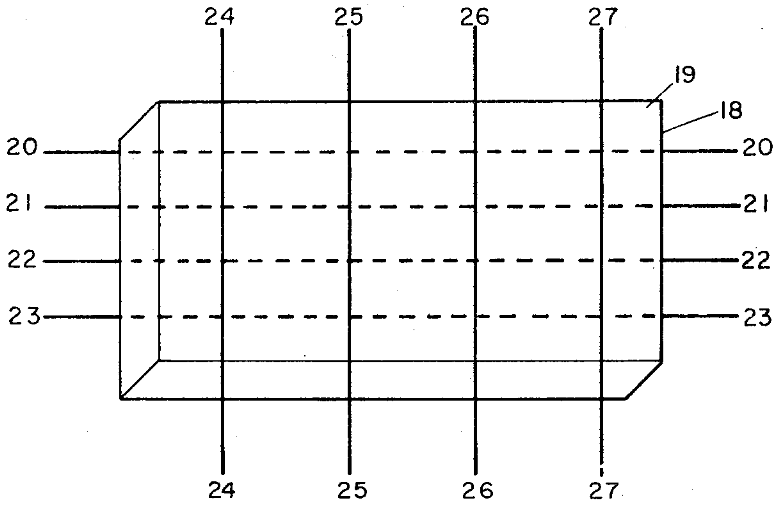
FIG. 7 illustrates a matrix employing the class of materials herein discussed.

Referring now to FIG. 7, a matrix 18 is shown comprising: a material 19 having the I-V memory characteristics shown in FIG. 4, a plurality of horizontal lower conductors 20, 21, 22, and 23, and a plurality of vertical upper conductors 24, 25, 26, and 27, which may be evaporated conductors upon the respective surface. Voltages needed to establish the memory state and to supply electric currents necessary to establish (or reestablish) the normal state can be connected randomly between an upper electrode and a lower electrode to provide a memory matrix. Typically, the matrix shown is no greater in thickness than about 5 mils; an electric field of about $10^3$ volts per millimeter is adequate to establish the memory state, and a current pulse of 0.4 amperes for a short time duration is adequate to reestablish the normal state.

Figure 9A:
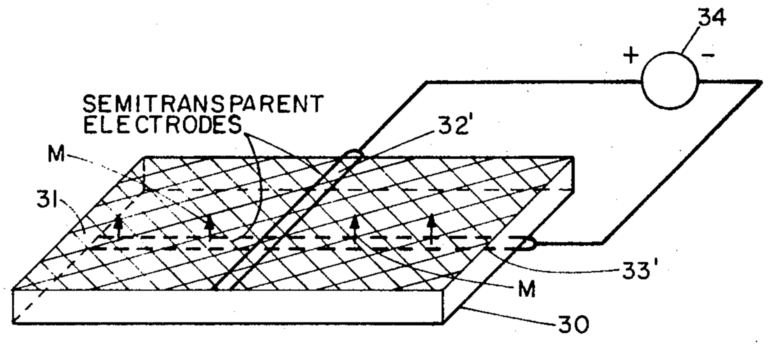
FIGS. 9A and 9B illustrate a matrix similar to that shown in FIGS. 8A to 8D.
Figure 9B:
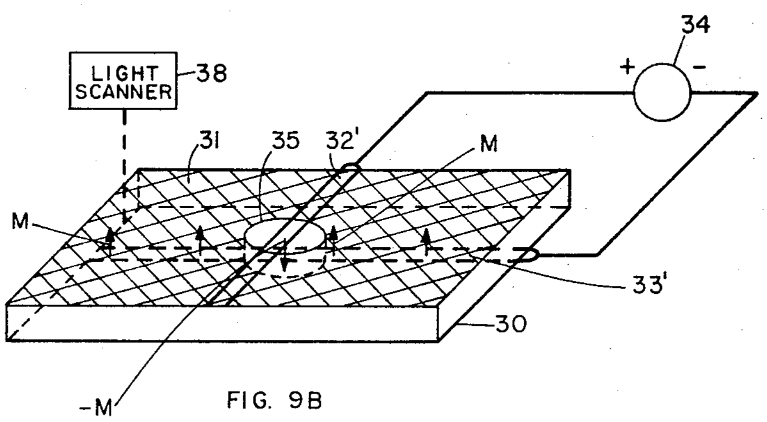
Figure 8A:
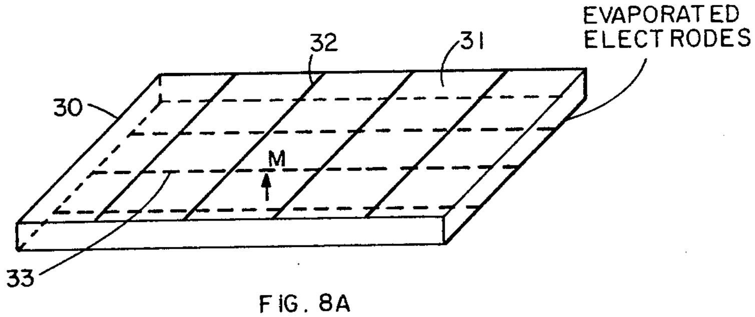
FIGS. 8A to FIG. 8D illustrate another matrix employing one group of the materials herein described.
Figure 8B:
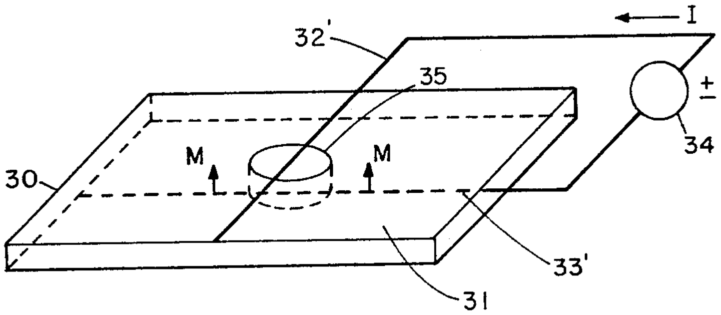
Figure 8C:
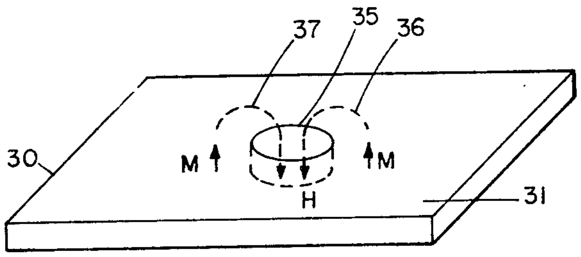
Figure 8D:
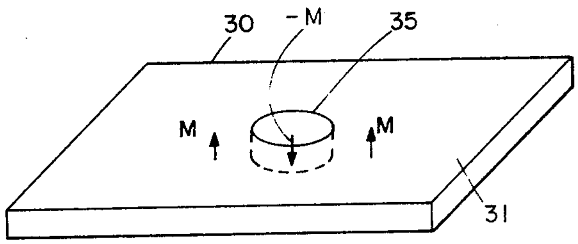

The semiconductive properties of any of the materials mentioned above, as represented by the I-V curves of FIG. 1 and FIG. 4, can be used in circuitry well known in the electronics field; in addition, however, and as particularly discussed in connection with FIGS. 8A, 8B, 8C and 8D with relation to orthoferrites, such semiconductive properties can perform other functions, as well. A relatively recent development in orthoferrites, sometimes called "magnetic bubbles," is discussed in a journal article entitled "Properties and Device Applications of Magnetic Domains in Orthoferrites," by A.H. Bobeck in The Bell System Technical Journal, Oct. 1967. The journal article discusses a system wherein magnetic domains in thin platelets(~2 mils thick) of an orthoferrite material can be made to perform memory, logic and transmission functions. The discussion now made in connection with FIGS. 8A–8D and later in connection with FIGS. 9A–9B relates to such a system; but, whereas the system in said journal article requires, for example, serial entry of information into memory, the present apparatus allows random write functions. Turning now to FIG. 8A, a matrix 30 is shown comprising a thin sheet or plate 31 of an orthoferrite material and having a plurality of upper conductors or electrodes 32 and a plurality of lower conductors or electrods 33 which may be placed upon the plate 31 surface by evaporation techniques to form upper and lower grid networks. The plate 31 is magnetized to saturation in the up direction, as indicated by the arrow labeled M. In FIG. 8B an upper conductor 32' and a lower conductor 33' are connected to a source of electric current 34 which impresses a voltage, typically the order of 75 volts , across the plate and a current I, typically the order of 50 milliampers, flows through the region of the plate generally encompassed by the cylindrical representation 35. The electric current I must be great enough in the region 35 to destroy M in that region by locally exceeding the curie point of the orthoferrite plate material. When that is done, the magnetic fields produced by the magnetization M adjacent to the region 35 provide field lines, as shown at 36 and 37 in FIG. 8C, which induce a reversed magnetization −M in the region 35, as shown in FIG. 8D, as the region cools below the curie point. The representation in FIGS. 9A and 9B are of the same matrix 30 as is shown in FIGS. 8A to 8D. The conductors 32' and 33' are shown having some width and are called "-semitransparent electrodes." The cross-hatched upper surface regions of both FIGS. 9A and 9B indicate a black appearance, the circled region 35, without cross-hatching, encompasses an area lighter in color than the rest. It is possible, using a light-beam scanner 38 to distinguish the dark from the light areas and thereby perform a read function; magnetic field sensing means can also be used to note the field direction changes.

The foregoing discussion is concerned with iron-oxide bearing ferromagnetic materials which display the I-V characteristics shown in FIGS. 1 and 4. There are, in addition, non-iron-oxide, ferroelectric materials, as for example, certain perovskites: tantalates ($KTaO_3$) doped with Ca and niobates (e.g., $K_xNa_{1-x}TaO_3$, $KNbO_3$, $KTa_xNb_{1-x}O_3 x$ varies from zero to one) and compounds derived therefrom, certain titanates (e.g., $BaTiO_3$, $Ba_xSr_{1-x}TiO_3$, where $x$ varies from zero to one), doped with Nb,V(0.001 to 0.01 mole percent, typically) and compounds derived therefrom which display the semiconductor I-V characteristics shown in FIG. 1. In addition, there are iron oxides (e.g., $Ni_yZn_{1-y}Fe_2O_4$ and $Mg_yZn_{1-y}Fe_2O_4$, where $0 \leq y < 0.2$) which display the characteristics represented in FIGS. 1 and 4 but are not magnetic.

The invention has been discussed with reference to the garnet YIG, but yttrium-gallium-iron-garnet and aluminum-iron-garnet are useful, and, again, the dopant, silicon, in the percentage mentioned in connection with YIG, and temperature reduction can be used. In addition other magnetic semiconducting oxides which contain ions in multivalent states (e.g., $Mn_3O_4$—$Mn^{2+}$,$Mn^{+}$) can be used. Other dopants can be used in the case of the orthoferrites and the spinels as, for example, Ti (0.01 mole percent, typically) to change the valence state of the cation, and the high temperature and times discussed will also perform the necessary reduction function.

The foregoing discussion is also pertinent to other than iron oxide materials. Materials of this latter class are ferroelectric or ferromagnetic and include oxides of the transition metals, i.e., Ti, V, Cr, Mn, Co, Ni, Ta, Nb, or, more generally, compounds which contain cations existing in two or more different valence states. Generally, a dopant is used which enters substitutionally into the lattice and has a valence state lesser than or greater than — but not equal to — the valence state of a dominant cation.

These and other modifications will occur to persons skilled in the art.

What is claimed is:

1. A matrix comprising, in combination, a thin plate single crystal or polycrystalline semiconducting magnetic orthoferrite material capable of supporting magnetic bubbles and which has non-linear current-voltage properties characterized by a high resistance branch and a negative resistance branch, a plurality of conductors secured as a grid at one surface of the plate, a plurality of further conductors secured as a grid at the other surface of the plate, and a source of electric potential connected to introduce a voltage between conductors at said one plate surface and conductors at said other plate surface.

2. Apparatus as claimed in claim 1 in which said material is one that also exhibits binary properties whereby regions of the plate can be placed in either a high electrical resistance normal state or a low electrical resistance memory state, the material being such that, when in the normal state, it can be switched to the memory state by applying between a conductor at said one plate surface and a conductor at said other plate surface an electric switching potential that exceeds a threshold voltage of the material in the region between the conductors and when the apparatus is the memory state it can be switched to the normal state by passing an electric current through said region from a conductor at said one plate surface and a conductor at the other plate surface.

3. Apparatus as claimed in claim 2 that further includes a source of electric potential connected to said conductors to energize the conductors in a determined pattern.

4. A matrix comprising, in combination, a thin plate single or polycryalline ferromagnetic iron-oxide material having a non-linear current vs. voltage characteristic which includes a high resistance branch and a negative resistance branch and in which the transition point therebetween can be controlled by effecting changes in the concentration of cations of the iron in the iron oxide, said iron oxide having an electrical resistance which decreases substantially with increasing temperature within the range of temperatures to which such materials are subjected in operating devices, a plurality of electrical conductors secured as a grid at one surface of the plate, a plurality of further electrical conductors secured as a grid at the other surface of the plate, and a source of electric potential connected to introduce a voltage between conductors at said one surface and conductors at said other surface.

5. A matrix as claimed in claim 4 in which said material is one which also exhibits binary properties whereby regions of the plate can be placed in either a high electrical resistance normal state or a low electrical resistance memory state.

6. A matrix comprising, in combination, a thin plate single or polycrystalline ferromagnetic iron-oxide material which exhibits binary properties whereby regions of the plate can be placed in either a high electrical resistance normal state or a low electrical resistance memory state, the curie point of the material being exceeded in the memory state to destroy ordered properties which exist in the normal state, said iron oxide having an electrical resistance which decreases substantially with increasing temperature within the operating temperature range, a plurality of electrical conductors secured as a grid at one surface of the plate, a plurality of further electrical conductors secured as a grid at the other surface of the plate, and a source of electric potential connected to introduce a voltage between conductors at said one surface and conductors at said other surface to create as alternate conditions the normal state and the memory state wherein the memory state the ordered magnetic properties are destroyed.

7. A device comprising, in combination, a thin plate of semiconducting magnetic material capable of supporting magnetic bubbles, said material having non-linear current vs. voltage bulk-material properties characterized by a high resistance branch and a negative resistance branch, electrical conductor means electrically connected to each surface of the plate and adapted to receive an electric potential to create an electric current through the plate between a conductor at one surface of the plate and a conductor at the other surface thereof, said electrical conductor means comprising a plurality of electrical conductors electrically connected to each surface of the plate in a matrix form, thereby to allow the creation of magnetic bubbles randomly within said plate, a bubble occurring in the material when it is magnetized to saturation and an electric current is passed through the plate from a conductor at one surface thereof to a conductor at the other surface thereof of sufficient magnitude to heat a local region of the material therebetween above the curie point locally destroying the ordered magnetic properties thereof.

8. Apparatus as claimed in claim 7 that includes a source of electric potential connected to said conductors, the voltage output of said source being sufficient in magnitude to place the material between energized conductors in the negative resistance branch, thereby exceeding the magnetic curie point of the material locally destroying the magnetic properties of the material.

9. Apparatus as claimed in claim 8 that further includes means for applying a magnetic field in a direction normal to the plane of the plate and of sufficient magnitude magnetically to saturate the plate.

10. Apparatus as claimed in claim 9 in which said material is one that also exhibits binary properties whereby regions of the plate can be placed in either a high electrical resistance normal state or a low electrical resistance memory state, the material being such that, when in the normal state, it can be switched to the memory state by applying between a conductor at said one plate surface and a conductor at said other plate surface an electric switching potential that exceeds a threshold voltage of the material in the region between the conductors and when the apparatus is in the memory state it can be switched to the normal state by passing an electric current through said region from a conductor at said one plate surface to a conductor at the other plate surface, a bubble being created in the material when the material is magnetized to saturation and is then switched to the memory state.

11. Apparatus as claimed in claim 10 which includes an electric potential means connected to said conductors and adapted to cause the apparatus at said region to generate one of the high resistance branch, the negative resistance branch, the memory state, and the normal state as successive or alternate conditions of operation.

12. Apparatus as claimed in claim 10 in which said material is chosen from the group consisting of orthoferrites, spinels, garnets, and perovskites in which the oxide is reduced to change the valence state of a cation thereby to provide said non-linear and/or binary characteristics.

13. Apparatus as claimed in claim 12 in which the material includes a dopant to effect the change in the valance state of the cations.

14. Apparatus as claimed in claim 13 in which the material is yttrium-iron-garnet and in which the dopant is silicon in amounts from about 0.005 to 0.3 percent.

15. Apparatus as claimed in claim 10 in which the material is oxide material and is selected from the group consisting essentially of $KTaO_3$, $K_xNa_{1-x}TaO_3$, $KNbO_3$, $KTa_xNb_{1-x}O_3$, $BaTiO_3$, $Ba_xSr_{1-x}TiO_3$, where $x$ varies from zero to one in each instance, and compounds derived therefrom.

16. Apparatus as claimed in claim 15 and in which the material contains predetermined small amounts of a dopant adapted to affect said concentration of a cations, the dopant being one that enters substitutionally into the lattice of the crystal and one that has a valence state either greater than or less than the valence state of the domination.

17. Apparatus as claimed in claim 10 in which the material is an oxide material and is selected from the group consisting essentially of the compounds $YFeO_3$, $TbFeO_3$, $NiFe_2O_4$, $FeFe_2O_4$, $MgFe_2O_4$, $MnFe_2O_4$, and $CoFe_2O_4$ plus various solid solutions of the compounds.

18. Apparatus as claimed in claim 17 in which the oxide material contains a dopant to reduce the oxide thereby to change the valence state of a cation thereof to provide the required resistance characteristics.

19. A matrix comprising, in combination, a thin plate single or polycrystalline oxide magnetic material wafer which also exhibits binary electric properties whereby regions of the plate can be placed in either a high electric resistance normal state or a low electric resistance memory state, said material having an electrical resistance which decreases substantially with increasing temperature within the operating temperature range, a plurality of electrical conductors secured as a grid at one surface of the plate, a plurality of further electrical conductors secured as a grid at the other surface of the plate, said conductors being adapted to receive an electric switching potential between a conductor at one surface of the plate and a conductor at the other surface of the plate that exceeds a threshold voltage of the oxide material, thereby to pass an electric current in the form of pulse through the plate from one electrode to the other to create as alternate condition the normal state and the memory state.

20. Apparatus as claimed in claim 19 that further includes a source of electric potential connected across said conductors.

21. A method of creating a magnetic bubble at any one of a number of regions of a thin film iron-oxide semiconductive garnet or a spinel or an orthoferrite single or polycrystalline matrix device which is also magnetic and which also exhibits binary and/or nonlinear electric characteristics, which regions of the thin film matrix can be placed in a high electrical resistance normal state or a low resistance memory state, or a high resistance branch or a negative resistance branch, that comprises: magnetizing the film to saturation in the thickness direction when the region is in either the normal state or the high resistance branch and applying across said film at each region of the matrix at which a bubble is to be created an electric switching potential that exceeds a threshold voltage of the film to switch the device to either the memory state or the negative resistance branch, thereby creating a magnetic bubble at each said region.

22. A matrix comprising, in combination, a thin plate of material taken from the group of normally insulating substances consisting of garnets, orthoferrites, spinels and perovskites, said substances containing cations in multivalent states to provide in said material a nonlinear current vs. voltage characteristic which includes a high resistance branch and a negative resistance branch with a transitions region therebetween and/or binary properties characterized by a high electrical resistance normal state or a low electrical resistance memory state, a plurality of conductors secured as a grid at one surface of the plate, a plurality of further conductors secured as a grid at the other surface of the plate, said conductors being adapted in use to connect to a source of electric potential connected to introduce a voltage between any one of the conductors at said one surface and any one of the conductors at said other surface, thereby to cause the material in the region between the duly energized conductors to assume one of the high resistance branch, the negative resistance branch, the memory state and the normal state as successive or alternate condition of operation.

* * * * *